United States Patent

Trim

[15] 3,670,244
[45] June 13, 1972

[54] STRAY ELECTRICAL ENERGY DETECTOR CIRCUIT

[72] Inventor: James H. Trim, Hurst, Tex.
[73] Assignee: LTV Aerospace Corporation, Dallas, Tex.
[22] Filed: June 29, 1970
[21] Appl. No.: 50,613

[52] U.S. Cl. ............................................. 324/72, 324/133
[51] Int. Cl. ................................. G01r 31/02, G01r 19/14
[58] Field of Search .............. 324/72, 76 IN, 133; 340/253 P, 340/248 C; 328/127

[56] References Cited

UNITED STATES PATENTS

| 3,229,274 | 1/1966 | Riley et al. | 324/72 UX |
| 2,774,940 | 12/1956 | Bernet | 324/102 |
| 3,444,393 | 5/1969 | Sassler | 328/127 |

Primary Examiner—Alfred E. Smith
Attorney—H. C. Goldwire and Walter T. Jagmin

[57] ABSTRACT

A circuit for detecting stray electrical energy in aircraft ordnance circuits and providing a warning signal if the stray electrical energy has such characteristics as to cause operation of pyrotechnic device, such as an igniter, if applied thereto.

10 Claims, 1 Drawing Figure

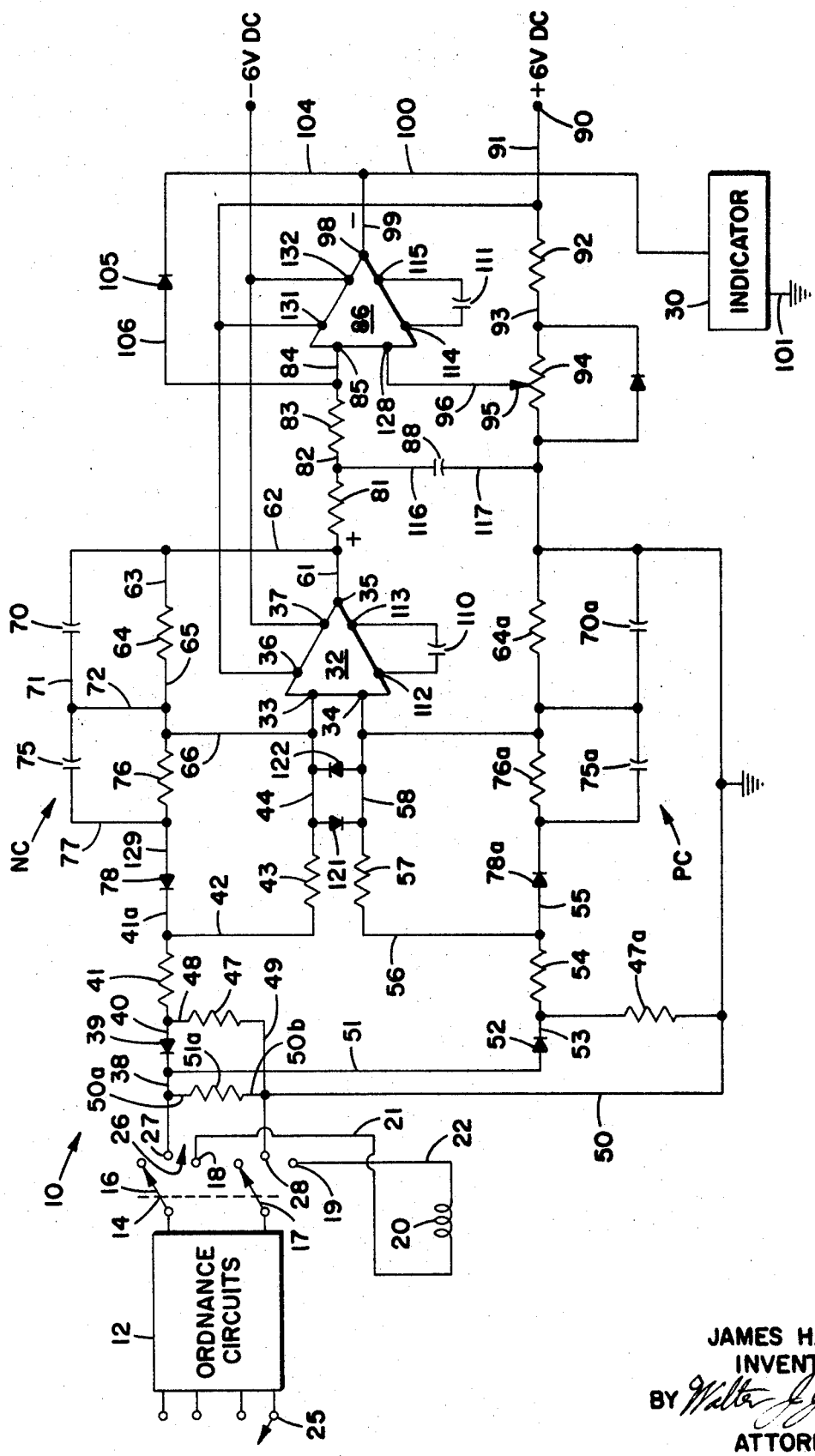
PATENTED JUN 13 1972
3,670,244
JAMES H. TRIM
INVENTOR
BY *Walter J Jager*
ATTORNEY

STRAY ELECTRICAL ENERGY DETECTOR CIRCUIT

This invention relates to detection circuits and, more specifically, to circuits for detecting currents of particular, heat-producing, characteristics. Electrically operated pyrotechnic devices are operated upon the application thereto of electric currents of proper voltage and duration. The igniters of such devices have a bridge wire whose temperature is raised to cause firing of a powder charge or the like. The electric current must be of such intensity or value and duration that the temperature of the igniter bridge wire, which is proportional to the energy applied thereto during a specified period of time minus the energy dissipated therefrom during such time interval, is raised to a value at which a charge is fired. It will be obvious that, due to the dissipation of heat from the igniter bridge wire, even though it be energized by an electric current of relatively low value for a prolonged period of time, it will not be raised to the firing temperature. Similarly if electrical energy of high value is applied across the wire for a short, interrupted period of time, its temperature again will not rise to the firing temperature. The firing circuits for causing operation of the igniters are of course designed to provide sufficient electrical energy of such intensity and duration as to cause operation of the igniters.

The ordnance circuits of aircraft, tanks, ships and the like, have strong electrical energy and voltages which, if they have the requisite characteristics, may cause operation of the igniter bridge wire of a firing device of an ordnance system. It is therefore necessary prior to the placement into operation of such ordnance system to test the input circuit of the ordnance circuit to ascertain if sufficient stray electrical energy is present in such circuit to cause improper operation of such igniter. The inactivation of a firing system due to a faulty indication of a test circuit used to detect such stray electric energy may abort a mission.

Accordingly, it is an object of this invention to provide a new and improved detector circuit for providing a warning signal only if stray electrical energy in another circuit has certain predetermined characteristics.

Another object is to provide a detector circuit for determining if the stray electrical energy in a second circuit, such as an ordnance control circuit, is of such characteristics that it would cause a pyrotechnic device, such as an igniter of an ordnance firing circuit, to be operated if it were transmitted thereto.

Still another object is to provide a detector circuit for detecting stray electrical energy in ordnance control circuits and providing a signal if the stray electrical energy is of such characteristics as would cause an igniter of an ordnance firing circuit to be operated if the ordnance firing circuit were connected to such ordnance circuit.

A further object of the invention is to provide a new and improved detector circuit which is responsive to stray currents of different durations, different frequencies and different polarities in ordnance control circuits and which provides a warning signal if the energy of such currents is of such integrated value that it would cause the operation of an ordnance firing circuit if applied thereto.

Additional objects and advantages of the invention will be readily apparent from the reading of the following description of a device constructed in accordance with the invention, and reference to the accompanying drawings wherein the single FIGURE is a diagrammatic illustration of the detector circuit embodying the invention.

Referring now to the drawing, the detector system 10 embodying the invention is used to determine if stray electrical energy present in the ordnance circuits 12 of an aircraft, vessel, tank or the like has such characteristics that if an enabling switch 14 having the two contacts 16 and 17, for example, is moved to the position wherein they engage the stationary contacts 18 and 19 of the switch, the transmittal of such stray electrical energy to an igniter bridge wire 20, connected by the conductors 21 and 22 across the contacts 18 and 19, would cause operation or ignition of a charge controlled by the wire 20, even though the firing switch 25 which controls the energization of the igniter bridge wire 20 is in its open position. The input circuit 26 of the detector may have terminals 27 and 28 which may be engaged by the contacts 16 and 17 of the enabling switch 14, while the firing switch 25 is in open position, and the stray electrical energy present in the ordnance circuits 12 will be applied across the input circuit 26 and, if the stray electrical energy has such characteristics that it would cause the raising of the bridge wire to such temperature as to cause firing of the weapon controlled thereby, the detector apparatus 10 will provide a signal to an indicator device 30 to warn the operator that if the enabling switch 14 is moved to the positions wherein its contacts 16 and 17 engage the contacts 18 and 19, the igniter bridge wire will be raised to a high firing temperature even though its appointed firing control switch 25 is open.

The ignition of the explosive or charge by the igniter bridge wire occurs only when the temperature of the igniter bridge wire 20 reaches a predetermined critical value. It will be apparent that a low value electric current flow through such wire for a prolonged period of time may never raise the temperature to such critical value since there is some dissipation of the heat from the wire. It will also be noted that if the igniter bridge wire is energized with a relatively high value current for a short period of time, due to the heat capacity of the wire and of its immediate environment, if the duration of the application of current is short, the wire again will not be raised to the critical temperature. Similarly, energization of the igniter bridge wire by pulses of relatively high voltage but low frequency will not raise the temperature of the wire to the critical value whereas pulses of high frequency of the same or even lower current amplitude may be sufficient to raise the temperature of the igniter bridge wire to the critical value.

Since the free or stray electrical energy present in the ordnance circuits 12 may be in the form of voltages of different polarities, frequencies, and amplitudes, the detector circuit 10 must have the capability of determining whether the integrated electrical energy, having any one or any combination of these characteristics present in the ordnance circuits 12, would cause the igniter bridge wire to be raised to the critical temperature. In this case, once it is determined that electrical energy of such characteristics is present in the ordnance circuits, the charge controlled by the igniter bridge wire must be rendered inactive until the cause of such excessive electrical energy is discovered and eliminated. Conversely, if the detector circuit causes the indicator 30 to give a warning if the stray electrical energy has one or more characteristics which is relatively high, as for example, a high voltage or a long time duration, but its other characteristics are such that the total or integrated energy would not be sufficient to cause the igniter bridge wire 20 to be raised to the critical temperature, valuable operational time of the weapon controlled by such igniter bridge wire 20 will be lost as the source of such stray energy is being determined.

The detector circuit 10 will therefore give a warning signal 30 only if the integrated electrical energy in the ordnance circuits 12 is such that it would cause the raising of the igniter bridge wire above the critical value even though stray high currents of short duration or low currents of long duration may be present in the ordnance circuits 12.

The detector circuit 10 includes an operational amplifier 32 of the type commercially available from National Semiconductor Company as Model LM101, which has an inverting input terminal 33, a non-inverting input terminal 34, an output terminal 35, a positive voltage power input terminal 36 and a negative voltage power input terminal 37. The inverting input terminal 33 is connected to the stationary contact 27 through a conductor 38, a Schottky barrier diode 39 which has a broad flat frequency response and sufficient peak reverse voltage rating to detect all expected signals, a conductor 40, resistance 41, conductors 41a and 42, a resistance 43 and a conductor 44. The common connection of the diode 39 and the resistance 41 is connected to the other input terminal 28 and to ground by means of a conductor 46, the resistance 47, and the conductors 49 and 50. It will thus be apparent that negative voltage pulses applied to the terminal 27 will be passed by the diode 39 and be transmitted to the input terminal 33. An impedance matching or setting resistance 51a for the circuit is connected between ground and the conductor 38 by the conductors 50a, 50b, 49, and 50. This resistance 51a simulates the resistance of the igniter bridge wire.

The positive voltage pulses are applied to the non-inverting input terminal 34 of the amplifier 32 by the conductors 38 and 51, a Schottky barrier diode 52, a conductor 53, a resistance 54, conductors 55 and 56, a resistance 57 and a conductor 58.

Due to the operational characteristics of the Schottky barrier diode 39, negative, relatively wide pulse signals are applied therethrough through the resistances 41 and 43 to the inverting input terminal 33 of the amplifier 32 and the negative pulse signals result in a positive voltage output at the output terminal 35 of the amplifier. A feedback circuit to the inverting terminal 33 is provided by the conductors 61, 62 and 63, a resistance 64 and the conductors 65, 66 and 44. It will be apparent that the direct current scale factor of the amplifier 32 is determined by the ratio of the combined values of the resistances 41 and 43 to the value of the feedback resistance 64.

A shunting capacitor 70 is connected across the feedback resistance 64 by conductors 62, 71, 72 and 65. The shunting effect of the capacitor 70 increases as the output pulses of the amplifier become narrower and of course this shunting reduces the effective feedback or closed loop gain of the amplifier 32 as the charge of the capacitor 70 is bled off or discharged through the resistance 64.

It will be apparent now that the feedback and shunting circuit provided by the resistance 64 and the capacitor 70 simulates the heat dissipation constant or thermal time constant of the igniter bridge wire 20 so that the effect of the short time pulses on the total output of the amplifier 32 will be less than the effect of pulses of similar amplitude but longer time applied across the terminals 27 and 28.

The decrease in the effective feedback or closed loop gain becomes greater than desired when the input pulses at the input circuit 26 become of relatively very small length, and the excessive gain reduction, due to this excess shunting effect of the capacitor 70, is compensated for by a capacitor 75 connected across the resistance 76 by means of the conductors 65, 72, 71, 77 and 129. A diode 78 for preventing discharge of the capacitor 75 through the resistance 41 and 47 is connected between the common connection of the capacitor 75 and the resistance 76 and the common connection of the resistances 41 and 43 by means of the conductors 41a and 42. The capacitor 75 is of smaller capacity than the capacitor 70 and discharges through the resistance 76.

The two capacitors 70 and 75 for shunting the resistances 64 and 76, and these resistances, are of such values that the feedback from the output terminal 35 to the inverting terminal 33 preserves the desired discharge time constant which is equal to the thermal time constant of the igniter bridge wire to cause the positive pulses transmitted thereto from the output terminal 35, when the enabling switch is moved to the position where its contact 16 and 17 engage the contacts 27 and 28, respectively, to cause the indicator 30 to give a warning signal only if the electrical energy, if applied across the igniter bridge wire, would cause the wire to attain the critical value.

The positive voltage pulses are transmitted through the Schottky barrier diode 52 (directioned oppositely than the diode 39) and resistances 54 and 57 to the non-inverting input terminal 34 of the amplifier 32. The circuit 10 has a compensating circuit PC for compensating for the width of the positive voltage pulses on the total or integrated output of the amplifier 32. Elements of such compensating circuit PC have been provided with the same reference numerals, to which the subscript a has been added, as the corresponding elements of the negative voltage pulse width compensating circuit NC. The compensating circuit PC, formed of the resistances 76a, 64a and the capacitors 75a and 70a, performs in the same manner as the compensating circuit NC formed of the resistances 64 and 76 and the capacitors 70 and 75 to provide the proper value signals to the non-inverting input terminal 34 of the amplifier 32 when positive voltage pulses are applied across the circuit 26 from the ordnance circuits 12. It will be apparent, of course, that even if only positive voltages are applied across the input circuit 26, the compensating circuit NC will operate, since the feedback circuit of the amplifier is always operational.

The positive voltage output of the operational amplifier 32 is transmitted through the conductor 61, the resistance 81, a conductor 82, a resistance 83 and a conductor 84 to the inverting terminal 85 of the amplifier 86 which may be identical to the amplifier 32.

The non-inverting terminal 128 of the amplifier 86 is connected to the positive side 90 of positive input voltage through a conductor 91, a resistance 92, a conductor 93, a variable resistance 94 and its adjustable contact 95 and a conductor 96. The output terminal 98 of the amplifier 86 is connected to the indicator 30 through the conductors 99 and 100, the other side of the indicator 30 being connected to ground through a conductor 101.

The output amplifier 86 also has a feedback circuit which includes the conductors 99 and 104, a diode 105, and the conductors 106 and 84.

The amplifiers 32 and 86 may have capacitors 110 and 111 connected across their terminals 112 and 113 and 114 and 115 in the usual manner and have positive and negative power supply voltages applied to their terminals 131 and 132, respectively.

A capacitor 88 is connected between the common connections of the resistances 81 and 83 and 64a and 94 by the conductors 116 and 117 to prevent a fast transient pulse from being fed to the non-inverting input of amplifier 86 through capacitor 70 if a step transition occurs at the input since at this time the amplifier is in instantaneous open circuit. The capacitor 88 and the resistor serves to filter out any such anomalous pulses.

The diodes 121 and 122 are connected reversely in parallel across the terminals 33 and 34 of the amplifier 32 to protect this amplifier from damage should an excessive voltage be applied to the input.

The setting of the contact 95 on the resistance 94 will, of course, determine at what adjusted value of the positive voltage applied to the terminal 85 of the amplifier, the amplifier will provide a negative voltage output at its output terminal 98.

It will now be seen that when it is necessary to check out the ordnance circuits of an aircraft, vessel, tank or the like, to see that all such circuits, as the one controlled by the wire 20, are operational and will not fire accidentally, the enabling switch 14 is first moved to the position wherein its contacts 16 and 17 engage its contacts 27 and 28. The firing switch 25 of the ordnance circuit, which connects the igniter bridge wire 20 across a source of current and thus cause the ignition of the charge controlled by the wire, is now open. When the enabling switch is thus moved to its testing position, if any stray currents of such characteristics as would cause the temperature of the igniter bridge wire 20 to rise above its critical value are present in such ordnance circuits, they are applied across the input circuit 26 of the detector 10 and this circuit integrates such currents, whether they be negative or positive pulses of either short or long duration, and causes the indicator to give a "No Go" signal if the characteristics of the currents are such that if such electric currents were applied across the igniter bridge wire 20 it would be raised to its critical temperature. Such stray electrical energy pulses, or currents, however, if their characteristics either due to the shortness of their pulses or low amplitude would not cause the igniter bridge wire to be raised to its critical temperature, cause the detector circuit 10 to activate the indicator 30 which may be a light bulb, buzzer, or the like. It will thus be seen that the detector circuit 10 discriminates between the various types of electrical energy which may be present in the ordnance circuits 12 and responds only to those whose characteristics are such as to cause the igniter bridge wire to be raised above its critical temperature.

While only one embodiment of the invention, together with modifications thereof, has been described in detail herein and shown in the accompanying drawing, it will be evident that various further modifications are possible in the arrangement and construction of its components without departing from the scope of the invention.

What is claimed is:

1. A detector circuit for detecting electric energy of predetermined characteristics, said detector circuit including: an input circuit; an amplifier having an inverting input terminal, a non-inverting input terminal, and an output terminal; means including unidirectionally conducting means connecting said input terminals to said input circuit for causing voltages of only one polarity supplied to said input circuit to be transmitted to said inverting input terminal and voltages of only the opposite polarity to be transmitted to said non-inverting input terminal, said amplifier voltages supplied to its input terminals and providing an output voltage of a predetermined polarity; a feedback circuit between said inverting input terminal and said output terminal; and shunting means operatively associated with said feedback circuit for shunting voltages of short periods of duration from said output terminals in said feedback circuit in a predetermined manner from said input terminal.

2. The detector circuit of claim 1, and a second amplifier connected to said first amplifier and providing an output voltage when the input voltage of said first mentioned amplifier rises to said predetermined value.

3. The detector circuit of claim 2, wherein said shunting means includes a capacitor and a resistance connected in parallel between said inverting and output terminals of said first mentioned amplifier.

4. The detector circuit of claim 3, wherein said shunting means includes a second capacitor and a second resistance connected in parallel between ground and said non-inverting terminal of said first mentioned amplifier.

5. The detector circuit of claim 4, and indicator means connected to said second amplifier and energizable by its output.

6. A detector circuit for detecting if stray electrical energy in a first circuit means is of such characteristics as to increase the temperature of an igniter wire to a critical value if applied to the igniter wire, said detector circuit including: an input circuit having a first terminal and a second terminal; means for connecting said input circuit across said first circuit means; an amplifier having an inverting input terminal, a non-inverting input terminal and an output terminal; a first means including a first unidirectional conducting device and resistance means connected in series between said first terminal and said inverting terminal; a second means including a second unidirectionally conducting device and resistance means connected in series between said first terminal and said non-inverting terminal, said first and second unidirectionally conducting devices conducting currents of opposite polarities to said inverting and non-inverting terminals; first and second shunting means operatively associated with said first and second means respectively for shunting currents of short durations in predetermined manner from said input terminals of said amplifier; and third means operable when the output of said amplifier attains a predetermined value.

7. The detector circuit of claim 6, wherein said first shunting means includes a resistance and a capacitance connected in parallel between said inverting and output terminals.

8. The detector circuit of claim 7, wherein said second shunting means comprises a resistance and a capacitance connected in parallel between said non-inverting terminal and said second terminal.

9. The detector circuit of claim 8, wherein said third means includes a second amplifier for providing an output signal when the output of said first mentioned amplifier attains a predetermined value.

10. The detector of claim 8, and indicator means energized by said second amplifier.

* * * * *